United States Patent [19]

Komiya et al.

[11] Patent Number: 5,244,230
[45] Date of Patent: Sep. 14, 1993

[54] STEERING WHEEL

[75] Inventors: Fuminori Komiya; Atsuhi Kimura; Tomohiko Ariyoshi, all of Aichi, Japan

[73] Assignee: Kabushiki Kaisha Tokai-Rika-Denki-Seisakusho, Aichi, Japan

[21] Appl. No.: 826,870

[22] Filed: Jan. 28, 1992

[30] Foreign Application Priority Data

Feb. 14, 1991 [JP] Japan .................. 3-005891[U]

[51] Int. Cl.$^5$ ............................................. B62D 1/11
[52] U.S. Cl. .................................... 280/777; 280/750; 74/552
[58] Field of Search ................... 280/777, 750; 74/552

[56] References Cited

U.S. PATENT DOCUMENTS

| | | | |
|---|---|---|---|
| 4,709,944 | 12/1987 | Hongo et al. | 280/750 |
| 4,879,923 | 11/1989 | Nagata | 74/532 |
| 4,920,821 | 5/1990 | Shinto et al. | |
| 5,134,899 | 8/1992 | Nagata et al. | 74/552 |

FOREIGN PATENT DOCUMENTS 58-202161 11/1983 Japan .

Primary Examiner—Margaret A. Focarino
Assistant Examiner—Paul Dickson
Attorney, Agent, or Firm—Sixbey, Friedman, Leedom & Ferguson

[57] ABSTRACT

A steering wheel has a substantially T-shaped groove, which is positioned on the side opposite to the side facing the driver, in a core portion provided at the center of the steering wheel. When a load is applied to the lowest portion of a steering wheel rim, bending moments are exerted on the steering wheel about the boss portion and deform the steering wheel about a line parallel to a line connecting two points where two lower spoke members on the core portion are secured to the steering wheel rim. The steering wheel simultaneously creates the predetermined magnitude of deformation due to the deformation of a top portion of the T-shaped groove which is bent in response to the intensive stress. When further load is applied to the steering wheel, angular moments are generated with the distal ends of the spoke members serving as bending portions about the line perpendicular to a line connecting two points where two lower spoke members in the core portion are secured to the steering wheel rim. At this time, the predetermined magnitude of deformation of the steering wheel can be maintained due to deformation of a leg portion of the T-shaped groove which is bent in response to the intensive stress.

25 Claims, 9 Drawing Sheets

STEERING WHEEL

BACKGROUND OF THE INVENTION

1. Field of the Invention

The present invention relates to a steering wheel for a vehicle.

2. Description of the Related Art

A conventional steering wheel for a vehicle has a boss portion which is formed on a core portion provided at the center of the steering wheel and is rigidly secured to a steering shaft, a plurality of spoke members extending radially from the boss portion, and a steering wheel rim having a circular or elliptical configuration and secured to the respective distal ends of the spoke members so that the driver may grip the rim when steering the vehicle.

These parts are coated with a synthetic resin to absorb the impact force which may be generated when the driver's body hits the steering wheel in a collision of the vehicle. In order to facilitate steering by the driver, the steering wheel is provided in such a manner that it is tilted downwardly toward the rear end of the vehicle at a predetermined angle with respect to the vertical axis of the vehicle.

In the steering wheel, partial deformation of the spoke members may absorb the impact force applied to the driver when an inertial force moves the driver's body forward to hit the steering wheel. To efficiently absorb the impact force, it is optimal to establish the relationship between the magnitude of deformation of the steering wheel (in the following discussion, "the magnitude of deformation" meaning the magnitude of forward deformation of the vehicle) and a load applied to the steering wheel. This relationship is illustrated in the curve in FIG. 7 which extends through the range other than the hatched portions.

The conventional steering wheel, however, does not fully meet the required value of the deformation characteristic of the steering wheel which is optimal to absorb the impact force thereof. Namely, the magnitude of deformation of the steering wheel decreases after the applied load exceeds F1, as illustrated by the broken line in FIG. 7.

SUMMARY OF THE INVENTION

In view of the facts set forth above, it is an object of the present invention to provide a steering wheel designed to meet the required value of the deformation characteristic of the steering wheel to optimally absorb the impact force generated when the driver's body hits the steering wheel in a collision.

The steering wheel according to the present invention comprises a core portion formed with a boss portion which is rigidly secured to the steering shaft of the vehicle, a plurality of spoke members radially extending from the core portion, and a steering wheel rim which is secured to the distal ends of spoke members, wherein the core portion and the spoke members are integrally cast at adjoining portions. The steering wheel further comprises a first deformation means which is provided in the core portion and is formed substantially parallel to first line which, when the vehicle is traveling straight forward connects two points where two lower spoke members are secured to the steering wheel rim, for deforming in response to the load applied to the steering wheel, and a second deformation means which is provided in the core portion and is formed along a second line which is perpendicular to first line and extends across the center of the boss portion, for deforming in response to the load applied to the steering wheel.

In the steering wheel with the above configuration, the collision of driver's body with the steering wheel causes deformation of the first deformation means which is intensively stressed by the load of the collision, and absorbs the load of the collision as the steering wheel is pushed and bent in the forward direction of the vehicle.

When a further large impact load is applied to the steering wheel, such a large impact load causes deformation of the second deformation means which is also intensively stressed by the load of the collision, and absorbs the load as the steering wheel is folded in the forward direction of the vehicle about second line which is perpendicular to first line connecting two points where the two lower spoke members are secured to the steering wheel rim and extends across the center of the boss portion.

Accordingly, in this embodiment, even if the steering wheel partially contacts with a part of the driver's body and the reaction force opposite to the direction of deformation of the steering wheel is applied to the steering wheel, deformation of the second deformation means can satisfy the required value of the deformation characteristic of the steering wheel.

DESCRIPTION OF THE PREFERRED EMBODIMENTS

Figure 1:
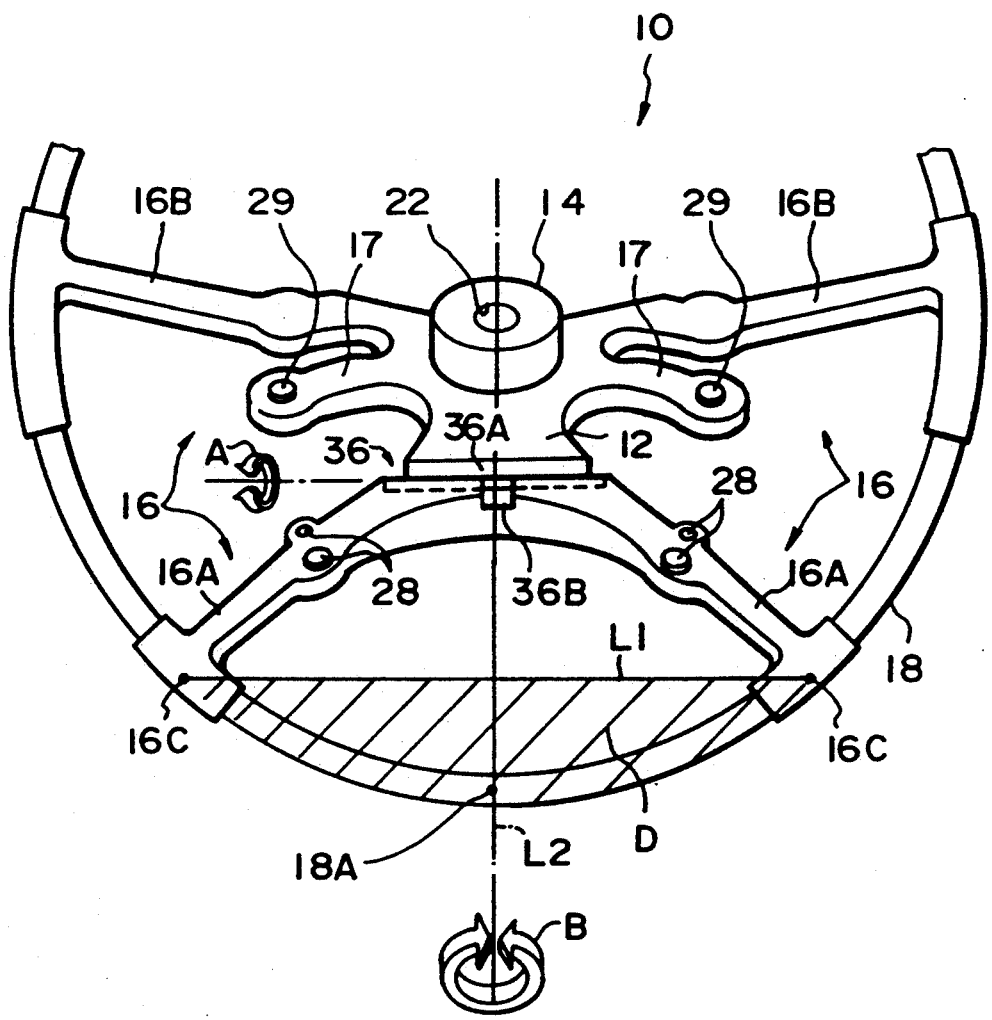
FIG. 1 is a perspective view of a first embodiment of a steering wheel as viewed from the front of a vehicle.

Referring to FIG. 1, a steering wheel 10 is cast from a light metal, for example, aluminum or magnesium, integrally with a core portion 12 which is located at the center of the steering wheel 10, a boss portion 14 which stands at the center of the core portion 12, a plurality of spoke members 16 which radially extend from the core portion 12, and a circular steering wheel rim 18 which is secured to the distal ends of the spoke members 16.

Figure 2:
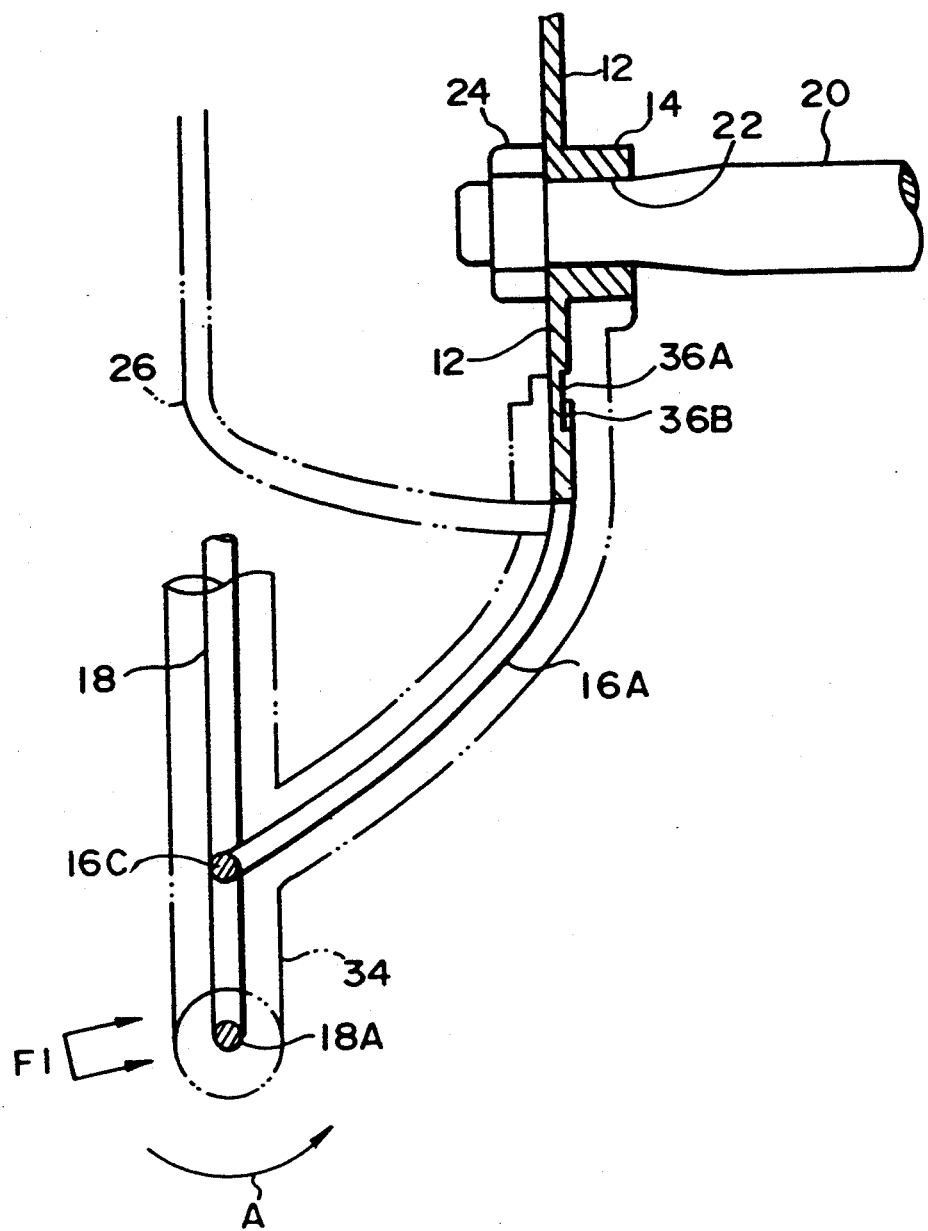
FIG. 2 is a sectional view showing the first embodiment of the steering wheel mounted on a steering shaft.

The boss portion 14 is formed into a cylindrical configuration with a circular mounting hole 22 at the center thereof, into which a steering shaft 20 is fitted and fixed by means of a nut 24 (see FIG. 2). The boss portion 14 is covered with a pad cover 26 which is fixed by means of unillustrated bolts coupled with pad cover mounting holes 28 formed substantially at the center of the spoke members 16 and mounting holes 29 of arm portions 17 (see FIG. 1).

The spoke members 16 comprise four spoke members 16A and 16B which have substantially rectangular sectional configurations. The spoke members 16A, as shown in FIG. 1, radially extend from the core portion 12 diagonally down to the left and the right and are smoothly bent toward the driver at positions in the vicinity of the pad cover mounting holes 28. Similarly, the spoke members 16B radially extend from the core portion 12 diagonally up to the left and the right and are smoothly bent toward the driver substantially at positions in the vicinity of the center of the vehicle.

Additionally, as shown in FIG. 2, each component for the steering wheel 10 is completely coated with a synthetic resin 34 to mitigate the impact force generated when the driver's body hits the steering wheel.

A substantially T-shaped groove 36 is provided, in the side opposite to the side facing the driver, at a position in the vicinity of the adjoining portions where the spoke members 16A extend from the core portion 12. A top portion 36A of the T-shaped groove 36 serves as a first deformation means of the groove 36 and is designed so as to be parallel to a line L1 connecting two points where the respective distal ends of the axes of the spoke members 16A are secured to the axis of the steering wheel rim 18. Further, the leg portion 36B of the T-shaped groove 36 serves as a second deformation means of the groove 36, and is formed along a line L2 which is perpendicular to the line L1.

Figure 5:
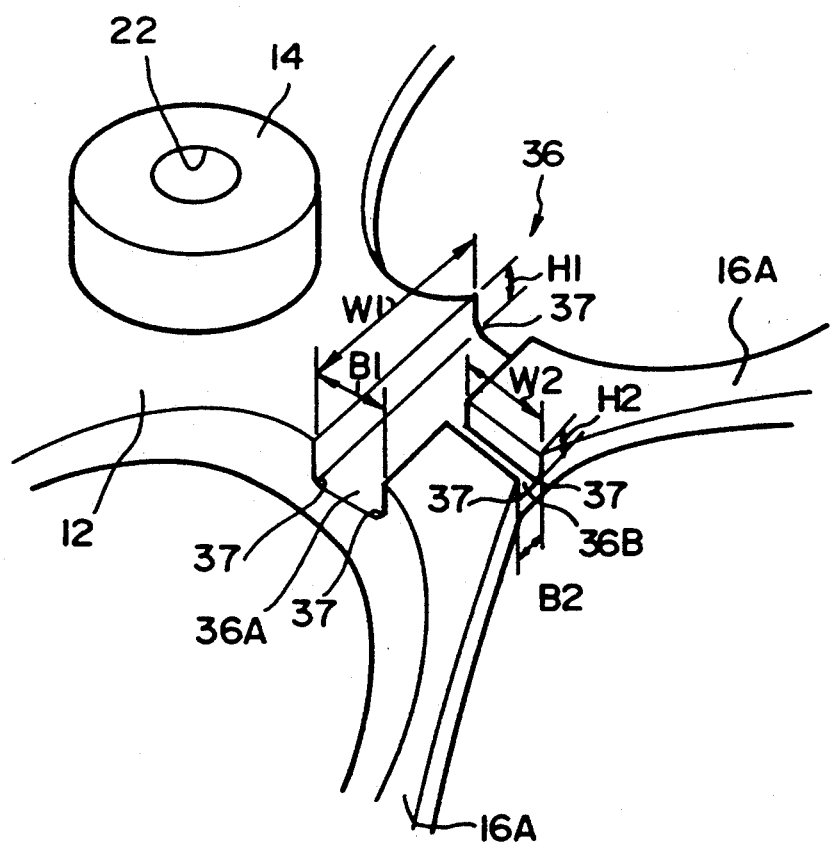
FIG. 5 is a partial perspective view showing a groove formed on a core portion of the first embodiment of the steering wheel.

Referring to FIG. 5, lengths W1, W2, widths B1, B2, and depths H1, H2 of the groove 36 can be determined depending on the material characteristics and sectional configuration of the core portion 12, and facilitate adjustment of the magnitude of deformation. Further, rounded portions which are formed at corner portions 37 of the groove 36 prevent the groove from rupturing by means of intensive stress.

Next, the deformation characteristic in a case in which a load is applied to the steering wheel of the present embodiment will be discussed.

In a normal running state of a vehicle, as shown in FIG. 2, the steering wheel 10 is not deformed since a large load is not applied to the steering wheel 10.

Figure 6:
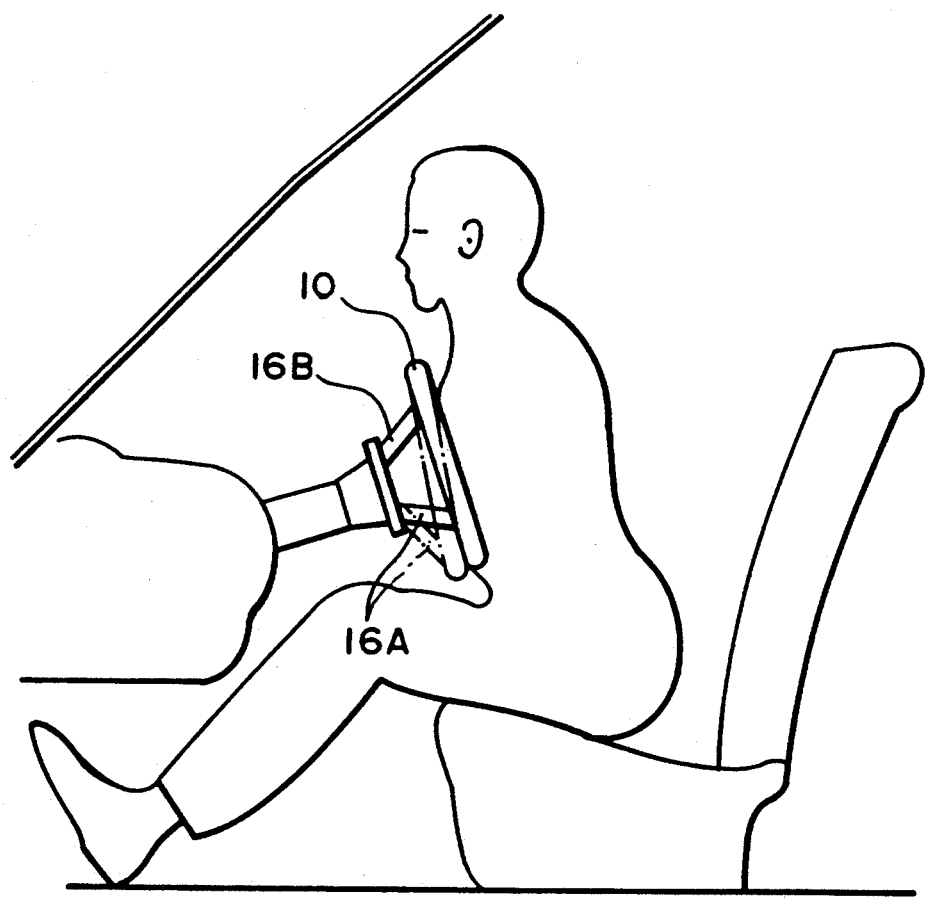
FIG. 6 is a schematic view showing the driver's body hitting the first embodiment of the steering wheel.

However, with reference to FIG. 6, when an inertial force generated by the collision of the vehicle moves the driver forward, a part of the driver's body hits the portion of the steering wheel 10 nearest of the driver, that is, the lowest portion 18A of the steering wheel rim 18. Accordingly, the load F1 applied to the steering wheel 10 applies bending moments thereto about the boss portion 14 in the direction of arrow A shown in FIGS. 1 and 2 (see FIG. 2). Thus, the top portion 36A of the T-shaped groove 36 is intensively stressed by the bending moments in the direction of arrow A, and deforms as shown in FIG. 2 until the driver's body hits the substantially triangular area D (the hatched area in FIG. 1) which is defined by the distal ends 16C of the spoke members 16A and the steering wheel rim 18. The deformation characteristic in this period is defined as the magnitude of deformation from 0 mm to 52 mm at the load from 0 to F1 as illustrated by the solid line in FIG. 7.

Figure 3:
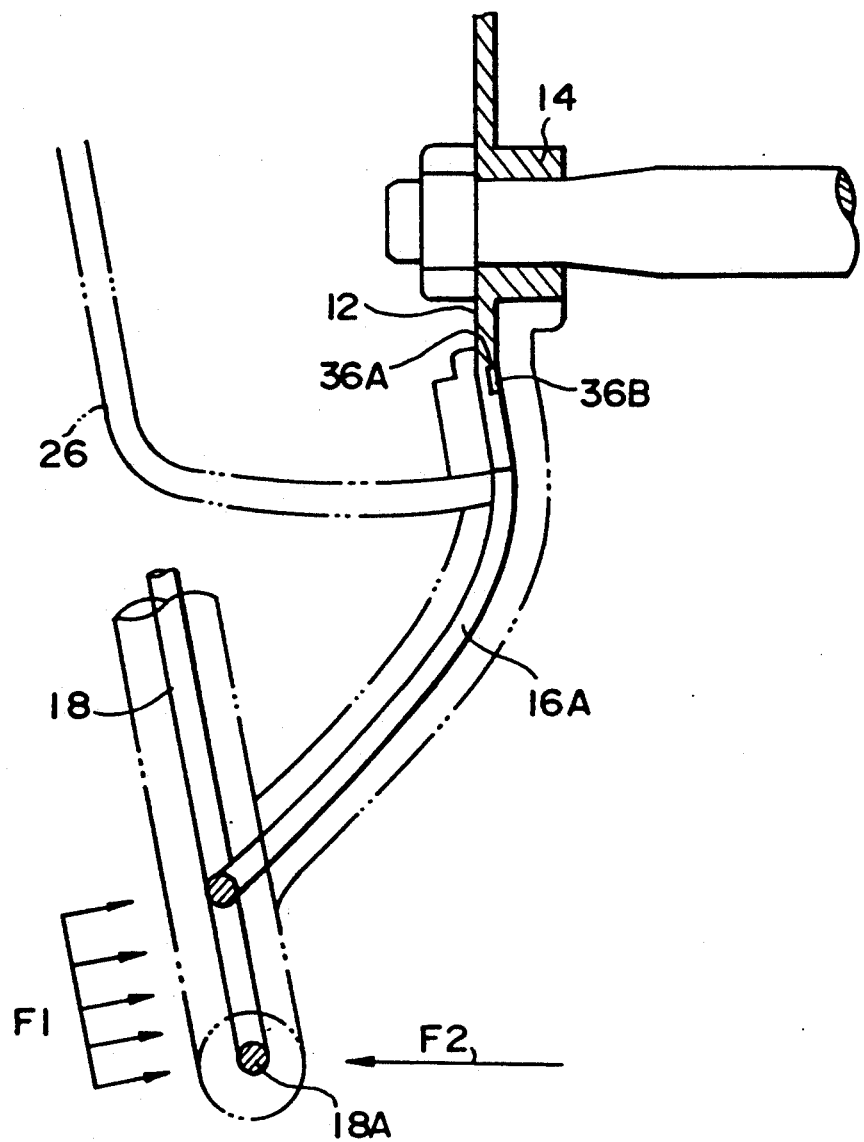
FIG. 3 is a sectional view showing deformation of the first embodiment of the steering wheel mounted on the steering shaft.
Figure 4:
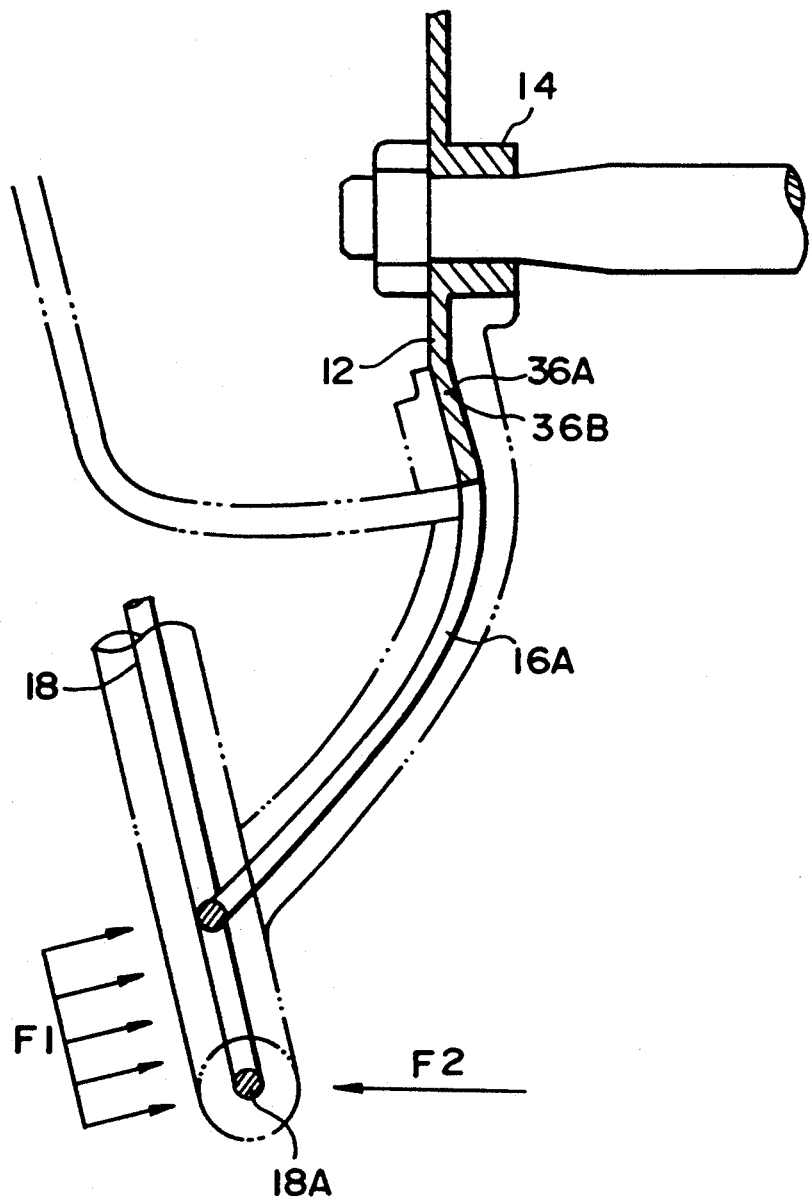
FIG. 4 is a sectional view showing deformation of the first embodiment of the steering wheel mounted on the steering shaft.

When further load is applied to the steering wheel 10, the reaction force F2, as shown in FIG. 3, is applied to the steering wheel 10. Therefore, bending moments are generated about the line L2 in the direction of arrow B with the distal ends 16C of the spoke members 16A serving as points of the steering wheel 10 on which the load of the driver acts due to inertial force. At this time, the steering wheel 10 tends to decrease the magnitude of deformation thereof according to the deformation characteristic depending on the rigidity of each component of the steering wheel 10. Simultaneously, intensive stress is exerted on the leg portion 36B of the T-shaped groove 36 formed along the line L2 to cause deformation of the steering wheel 10 as well as deformation of the leg portion 36B of the T-shaped groove 36 until the driver's body hits the pad cover 26, and thus additionally provides the increased magnitude of deformation thereof over 53 mm. This deformation characteristic can be illustrated in a substantially straight line shown in FIG. 7.

Figure 7:
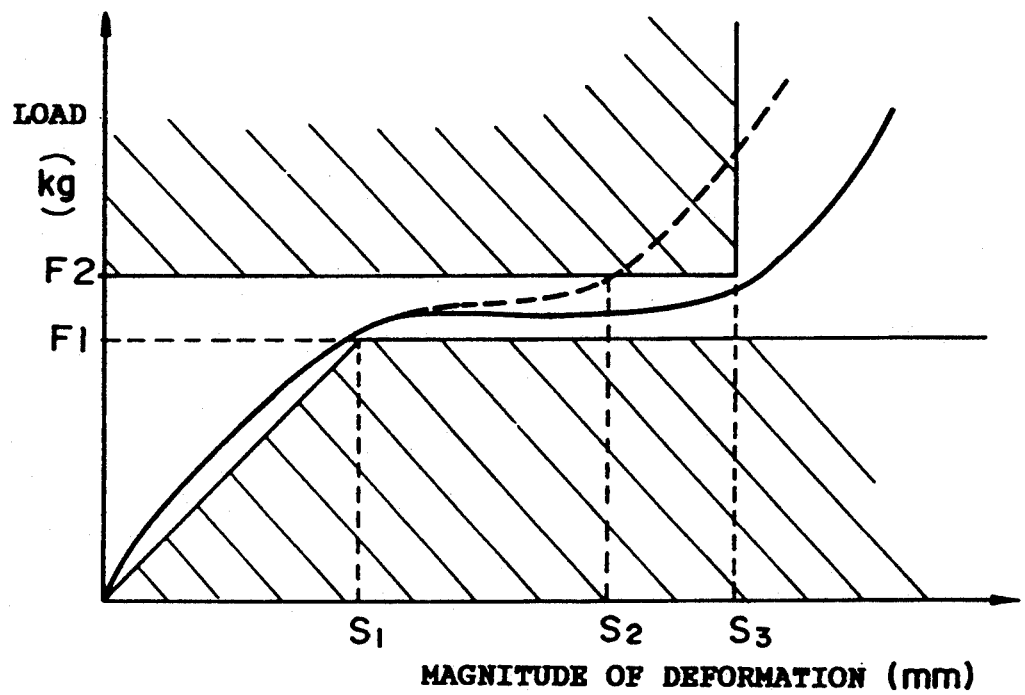
FIG. 7 is a graph showing the required value of the deformation characteristic of the steering wheel illustrated in terms of the relationship between the load and the magnitude of deformation.

The conventional steering wheel has a small magnitude of deformation thereof such that the deformation characteristic, as shown by the broken line in FIG. 7, can be formed only depending on the rigidity of the members after the applied load exceeds F2. As explained above, in this embodiment, the load applied to the steering wheel 10 from F1 to F2, as shown by the solid line, causes deformation of the leg portion 36B of the T-shaped groove 36. The magnitude of deformation of the steering wheel 10 to increases up to 53 mm. Therefore, the impact force applied to the driver's body is absorbed enough.

Figure 8:
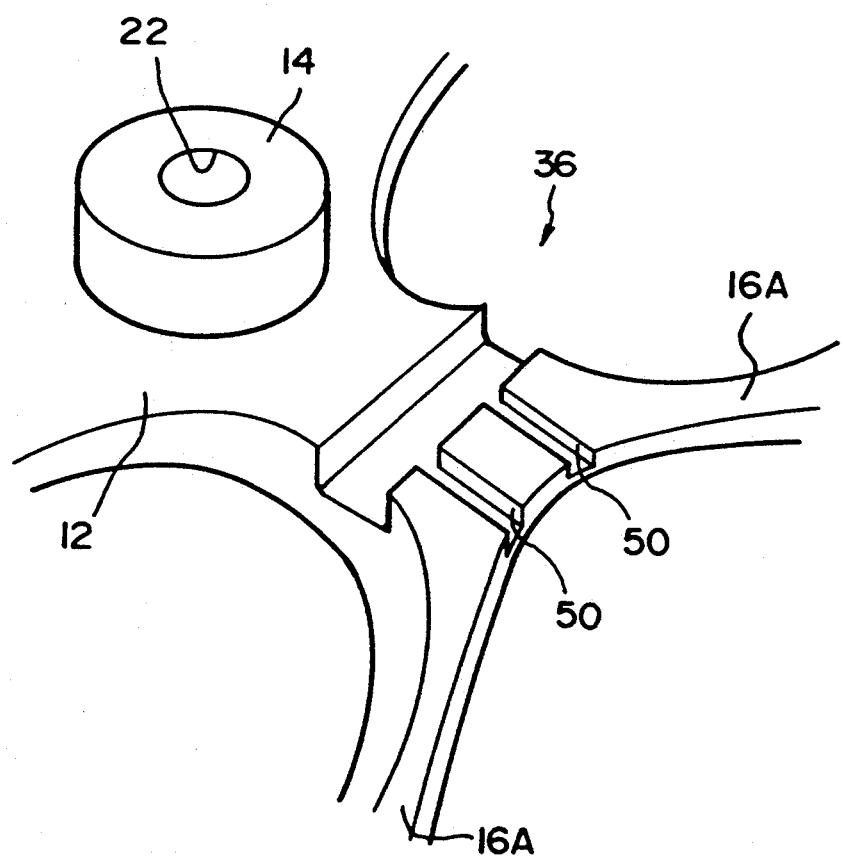
FIG. 8 is a partial perspective view showing grooves formed on the core portion of a second embodiment of the steering wheel.
Figure 9:
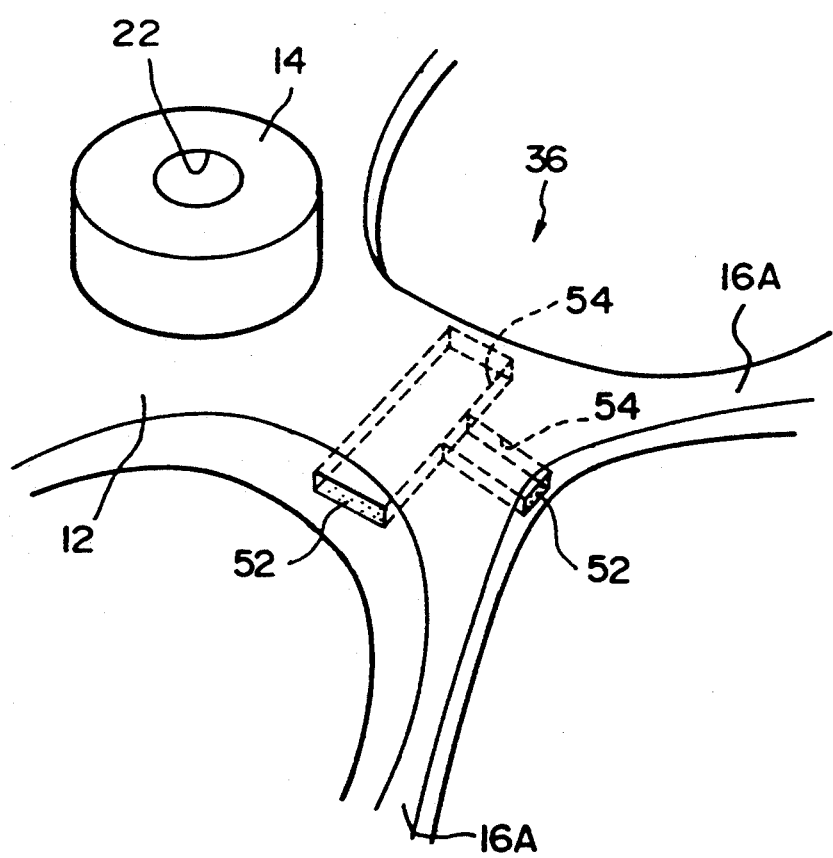
FIG. 9 is a partial perspective view showing cavities provided in the core portion of a third embodiment of the steering wheel.

In the above embodiment, the configuration of the groove 36, serving as the deformation means of the steering wheel 10, is not necessarily limited to the shape of a substantial T so that the leg portion 36B of the T-shaped groove 36 is not necessarily located along the line L2. For example, a plurality of grooves 50 may be set parallel to the line L2 as shown in a second embodiment in FIG. 8, or many depressions may be linearly arranged on the steering wheel. Furthermore, a cavity 54 may be employed as a weakening means as shown in a third embodiment in FIG. 9. A material 52 may be inserted in the above-mentioned groove 50 and cavity 54. As shown in FIG. 9, all inner wall portions of the substantially T-shaped groove are defined within an interior portion of the core.

What is claimed is:

1. A steering wheel for a vehicle comprising:
   a core portion formed with a boss portion which is rigidly secured to a steering shaft of the vehicle;
   at least two spoke members radially extending from said core portion; and
   a steering wheel rim which is secured to distal ends of said spoke members,
   wherein said spoke members are formed integrally with said steering wheel, and said core portion and said spoke members are integrally cast at adjoining portions, said steering wheel further comprising:
   a first deformation means which is provided in said core portion at a section of said core portion lower than said boss portion when the vehicle is traveling straight forward, and is formed substantially parallel to a first line which, when the vehicle is traveling straight forward, connects two points where the respective distal ends of said at least two spoke members are secured to said steering wheel rim, for deforming in response to a load applied to said steering wheel; and a second deformation means which is provided in said core portion at a section of said core portion lower than said boss portion when the vehicle is traveling straight forward, and is formed along a second line which is perpendicular to said first line and extends across the center of said boss portion for deforming in response to a load applied to said steering wheel.

2. A steering wheel according to claim 1, wherein said first deformation means comprises a top portion of a substantially T-shaped groove which is formed on said core portion in the side opposite to the side facing the driver, and said top portion being arranged substantially parallel to said first line.

3. A steering wheel according to claim 2, wherein said top portion of said substantially T-shaped groove is filled with a material which differs from material of said steering wheel rim and can easily be deformed.

4. A steering wheel according to claim 2, wherein a configuration of a circular arc is provided at a corner portion between a base of said top portion of said substantially T-shaped groove and surfaces rising from said base.

5. A steering wheel according to claim 1, wherein said second deformation means comprises a leg portion of a substantially T-shaped groove which is formed on said core portion in the side opposite to the side facing the driver, said leg portion being perpendicular to said first line and parallel to said second line.

6. A steering wheel according to claim 1, wherein said second deformation means comprises a leg portion of a substantially T-shaped groove which is formed on said core portion in the side opposite to the side facing the driver, said leg portion being perpendicular to said first line and being arranged above said second line.

7. A steering wheel according to claim 6, wherein a configuration of a circular arc is provided at a corner portion between a base of said leg portion of said substantially T-shaped groove and surfaces rising from said base.

8. A steering wheel according to claim 1, wherein said second deformation means comprises a plurality of grooves which is perpendicular to said first line and is parallel to said second line.

9. A steering wheel according to claim 5, wherein said leg portion of said substantially T-shaped groove is filled with a material which differs from material of said steering wheel rim and can easily be deformed.

10. A steering wheel according to claim 1, wherein said first and second deformation means comprise circular depressions.

11. A steering wheel according to claim 5 wherein said leg portion is formed such that sides thereof are symmetric with respect to a longitudinally-extending central line of said leg portion.

12. A steering wheel according to claim 2, wherein all inner wall portions of said substantially T-shaped groove are defined with an interior portion of said core.

13. A steering wheel for a vehicle comprising:
a core portion formed with a boss portion which is rigidly secured to a steering shaft of the vehicle;
at least two spoke members radially extending from said core portion; and
a steering wheel rim which is secured to distal ends of said spoke members,
wherein said spoke members are formed integrally with said steering wheel, and said core portion and said spoke members are integrally cast at adjoining portions, further comprising:
a first weakening means which is provided on said core portion at a section of said core portion lower than said boss portion when the vehicle is traveling straight forward, and is arranged substantially parallel to a first line which, when the vehicle is traveling straight forward, connects two points where the respective distal ends of said at least two spoke members are secured to said steering wheel rim for deforming in response to a load applied to said steering wheel; and
a second weakening means which is provided on said core portion between said at least two spoke members for deforming in response to the load applied to said steering wheel.

14. A steering wheel according to claim 13, wherein said first weakening means comprises a top portion of a substantially T-shaped cavity which is formed on said core portion in the side opposite to the side facing the driver, and said top portion being arranged substantially parallel to said first line.

15. A steering wheel according to claim 14, wherein a configuration of a circular arc is provided at a corner portion between a base of said top portion of said substantially T-shaped cavity and surfaces rising from the base.

16. A steering wheel according to claim 14, wherein said top portion of said substantially T-shaped cavity is filled with a material which differs from material of said steering wheel rim and can easily be deformed.

17. A steering wheel according to claim 13, wherein said second weakening means comprises a leg portion of a substantially T-shaped cavity which is formed on said core portion in the side opposite to the side facing the driver, said leg portion being perpendicular to said first line and is arranged parallel to a second line which is perpendicular to said first line and extends across the center of said boss portion.

18. A steering wheel according to claim 13, wherein said second weakening means comprises a leg portion of a substantially T-shaped cavity which is formed on said core portion in the side opposite to the side facing the driver, said leg portion being perpendicular to said first line and being arranged above a second line extending through the center of said boss portion.

19. A steering wheel according to claim 18, wherein a configuration of a circular arc is provided at a corner portion between a base of said leg portion of said substantially T-shaped cavity and surfaces rising from said base.

20. A steering wheel according to claim 13, wherein said second weakening means comprises a plurality of cavities which is perpendicular to said first line and is arranged parallel to a second line extending through the center of said boss portion.

21. A steering wheel according to claim 17, wherein said leg portion of said substantially T-shaped cavity is filled with a material which differs from material of said steering wheel rim and can easily be deformed.

22. A steering wheel according to claim 17 wherein said leg portion is formed such that sides thereof are symmetric with respect to a longitudinally-extending central line of said leg portion.

23. A steering wheel according to claim 14, wherein all inner wall portions of said substantially T-shaped groove are defined with an interior portion of said core.

24. A steering wheel for a vehicle comprising:

a core portion formed with a boss portion which is rigidly secured to a steering shaft of the vehicle;

at least two spoke members radially extending from said core portion; and a steering wheel rim which is secured to distal ends of said spoke members, wherein said spoke members are formed integrally with said steering wheel, and said core portion and said spoke members are integrally cast at adjoining portions, said steering wheel further comprising:

a first deformation means which is provided in said core portion at a section of said core portion lower than said boss portion when the vehicle is traveling straight forward, and is formed substantially parallel to a first line which, when the vehicle is traveling straight forward, connects two points where the respective distal ends of said at least two spoke members are secured to said steering wheel rim for deforming in response to a load applied to said steering wheel; and a second deformation means which is provided in said core portion at a section of said core portion lower than said boss portion when the vehicle is traveling straight forward, and is formed along a second line which is perpendicular to said first line and extends across the center of said boss portion for deforming in response to a load applied to said steering wheel, said first deformation means comprises a top portion of a substantially T-shaped groove which is formed on said core portion in the side opposite to the side facing the driver, and said top portion being arranged substantially parallel to said first line.

25. A steering wheel for a vehicle comprising:

a core portion formed with a boss portion which is rigidly secured to a steering shaft of the vehicle;

at least two spoke members radially extending from said core portion; and a steering wheel rim which is secured to distal ends of said spoke members, wherein said spoke members are formed integrally with said steering wheel, and said core portion and said spoke members are integrally cast at adjoining portions, further comprising:

a first weakening means which is provided on said core portion and is arranged substantially parallel to a first line which, when the vehicle is traveling straight forward, connects two points where the respective distal ends of said at least two spoke members are secured to said steering wheel rim, for deforming in response to load applied to said steering wheel; and a second weakening means which is provided on said core portion between said two spoke members, for deforming in response to the load applied to said steering wheel, said first weakening means comprises a top portion of a substantially T-shaped cavity which is formed on said core portion in the side opposite to the side facing the driver, and said top portion being arranged substantially parallel to said first line.

* * * * *

UNITED STATES PATENT AND TRADEMARK OFFICE
CERTIFICATE OF CORRECTION

PATENT NO. : 5,244,230
DATED : September 14, 1993
INVENTOR(S) : Fuminori Koniya, et. al.

It is certified that error appears in the above-indentified patent and that said Letters Patent is hereby corrected as shown below:

On the Title page, item [75] Inventors: "Atsuhi Kimura" should read--

Atsushi Kimura--.

Signed and Sealed this

Twenty-second Day of February, 1994

Attest:

BRUCE LEHMAN

Attesting Officer    Commissioner of Patents and Trademarks